United States Patent [19]
Beaudoin

[11] Patent Number: 5,814,167
[45] Date of Patent: Sep. 29, 1998

[54] STAMPED-METAL CLIP FOR USE WITH AN ENDLESS TRACK BELT COOPERATING WITH SLIDE RAILS

[76] Inventor: Maurice Beaudoin, 850, 111e Avenue, Drummondville, Québec, Canada, J2B 4L2

[21] Appl. No.: 774,889

[22] Filed: Dec. 27, 1996

[51] Int. Cl.⁶ .............................. B62D 55/08; C21C 8/00
[52] U.S. Cl. ........................ 148/639; 148/644; 305/168; 305/192
[58] Field of Search ................................ 305/168, 169, 305/178, 179, 181, 192, 194; 301/126; 384/42, 625; 148/639, 644

[56] References Cited

U.S. PATENT DOCUMENTS

| | | | |
|---|---|---|---|
| 2,343,533 | 5/1944 | Burnham | 308/5 |
| 2,549,930 | 4/1951 | Riegel et al. | 305/192 X |
| 3,071,981 | 1/1963 | Kuntzmann | 384/625 X |
| 3,275,389 | 9/1966 | Neilson et al. | 384/625 X |
| 3,550,968 | 12/1970 | Rhymes | 305/54 |
| 3,722,961 | 3/1973 | Haley et al. | 305/25 |
| 3,774,979 | 11/1973 | Harris | 305/24 |
| 3,799,626 | 3/1974 | Kilbane, Jr. | 305/35 |
| 3,887,243 | 6/1975 | Chaumont | 305/24 |
| 4,023,865 | 5/1977 | Morissette | 305/35 |
| 4,217,006 | 8/1980 | Dehnert | 305/35 |
| 4,279,449 | 7/1981 | Martin et al. | 305/35 |
| 4,474,414 | 10/1984 | Tokue | 305/35 |
| 4,795,221 | 1/1989 | Simmons | 305/35 |
| 4,880,281 | 11/1989 | Merkelbach | 301/126 |
| 4,974,970 | 12/1990 | Sugita et al. | 384/12 |
| 4,991,911 | 2/1991 | Blais | 305/24 |
| 5,174,638 | 12/1992 | Tokue et al. | 305/35 |
| 5,183,318 | 2/1993 | Taft et al. | 305/39 |
| 5,267,796 | 12/1993 | Nonaka et al. | 384/8 |
| 5,415,470 | 5/1995 | Courtemanche | 305/38 |
| 5,501,526 | 3/1996 | Asai et al. | 384/13 |

FOREIGN PATENT DOCUMENTS

| | | | |
|---|---|---|---|
| 1145567 | 10/1957 | France | 305/192 |
| 1755630 | 10/1973 | Germany | 305/194 |

*Primary Examiner*—Russell D. Stormer
*Attorney, Agent, or Firm*—Collard & Roe, P.C.

[57] ABSTRACT

The stamped-metal clip is suitable for use with an endless track belt cooperating with slide rails. The clip comprises a main portion having a hardened bearing surface to be engaged against at least one of the slide rails. The bearing surface has a hardness greater than 35 HRC, preferably between 40 and 60 HRC. The clip further comprises an unhardened fastening portion comprising two curved wings to clamp the main portion to the track belt without rupture. These curved wings have a hardness smaller than the hardness of the bearing surface, preferably smaller than 35 HRC. The hardness of the bearing surface makes it resistant to wear and friction and the smaller hardness of the wings enables the clip to be clamped to the track belt without rupture.

9 Claims, 3 Drawing Sheets

STAMPED-METAL CLIP FOR USE WITH AN ENDLESS TRACK BELT COOPERATING WITH SLIDE RAILS

This application claims the benefit of the filing date of U.S. Provisional application Ser. No. 60/027,293, filed on Oct. 2, 1996.

FIELD OF THE INVENTION

The present invention relates to a stamped-metal clip or guide clip for use with an endless track belt cooperating with slide rails and to a track belt equipped with such a clip.

BACKGROUND

Conventional endless track belts having to cooperate with slide rails such as snowmobile track belts are typically provided with a series of sheet metal clips extending at spaced intervals therealong in two separated rows positioned to engage against the slide rails in sliding bearing contact. Examples of prior art clips are shown in U.S. Pat. Nos.: 4,217,006; 3,887,243; 4,023,865; 4,474,414; 4,991,911 and 5,415,470. Typically, these clips are formed with a generally rectangular bearing portion and two integral wings extending downwardly from opposite sides of the bearing portion for clamping the clip to the track belt. Some clips called guide clips further comprise a guide part projecting outwardly and upwardly from one end of the bearing portion to keep the track belt in alignment with the corresponding slide rail.

Qualities highly sought after in the making of those clips are notably the following. A bearing surface with an optimal friction coefficient is desirable, on one hand to provide a good sliding effect between the bearing surface and the corresponding slide rail and, on another hand, to stand up to wear caused by the friction generated between the bearing portion and the slide rail. The clip should also be resistant to rupture mainly upon installation on the track belt where the wings have to open slightly in order to clamp the clip on the track guide.

U.S. Pat. No. 5,425,470 teaches one way to optimize the friction coefficient between the bearing surface and the slide rail. This document discloses a clip for a snowmobile comprising a bearing surface provided with at least one depression. The snow accumulates in the depression and melts therein to generate a film of water between the bearing surface and the corresponding slide rail. This film of water reduces the friction existing between the slide rail and the bearing surface. A drawback with this type of clip is that it is suitable only for snowmobile track belts. A tracked vehicle provided with those clips has to be used on a surface covered with snow.

In prior art, the resistance to rupture upon installation of the clip on the track guide is typically achieved by making a clip that shows a uniform hardness throughout the entire clip. This hardness is not higher than 35 HRC for allowing the mounting wings to undergo a certain deformation without rupture upon installation of the clip on the track guide.

Thus presently, there is still a need for a durable, long lasting clip or guide clip suitable for use with any endless track belt and that shows a good resistance to rupture and an optimum friction coefficient between its bearing surface and a slide rail.

SUMMARY

An object of the present invention is to provide a clip or guide clip that satisfies these above mentioned needs.

In accordance with the present invention, this object is achieved with a stamped-metal clip for use with an endless track belt cooperating with slide rails. The clip comprises a main portion having a hardened bearing surface to be engaged against at least one of the slide rails, the bearing surface having a given hardness. The clip further comprises an unhardened fastening portion to clamp the main portion to the track belt without rupture and having a hardness smaller than the hardness of the bearing surface.

This object is also achieved with a stamped-metal clip comprising a main portion having a hardened bearing surface to be engaged against at least one of the slide rails. The bearing surface has a hardness greater than 35 HRC. The clip further comprises a deformable fastening portion to clamp the main portion to the track belt without rupture, the deformable fastening portion has a hardness smaller than 35 HRC.

Another object of the present invention is to propose a method for improving a stamped-metal clip for use with an endless track belt cooperating with slide rails, the stamped-metal clip being made of steel and including a main portion having a bearing surface to be engaged against at least one of the slide rails and a fastening portion to clamp the main portion to the track belt. The method comprises the steps of:

a) austenizing only the main portion of the clip; and b) quenching the entire clip at a temperature providing a hardness of the main portion higher than 35 HRC.

A still further object of the present invention is to propose another method for improving a stamped-metal clip as described just above, the method comprising the steps of:

a) austenizing the entire clip; and b) quenching only the main portion of the clip at a temperature providing a hardness of the bearing surface higher than 35 HRC and slowly cooling the fastening portion.

Advantageously, thanks to the hardened bearing surface, the stamped-metal clip according to the invention provides an optimum friction coefficient between the bearing surface and the corresponding slide rail. As can be understood, this hardened bearing surface improves greatly the resistance to wear of the clip compared with prior art clips. Moreover, and thanks to the unhardened fastening portion, the clip has a good resistance to rupture upon installation on the track belt.

Thus, in an unexpected simple manner, the stamped-metal clip according to the invention provides to the clip qualities highly sought after for such a clip.

DESCRIPTION OF THE DRAWINGS

Figure 1:
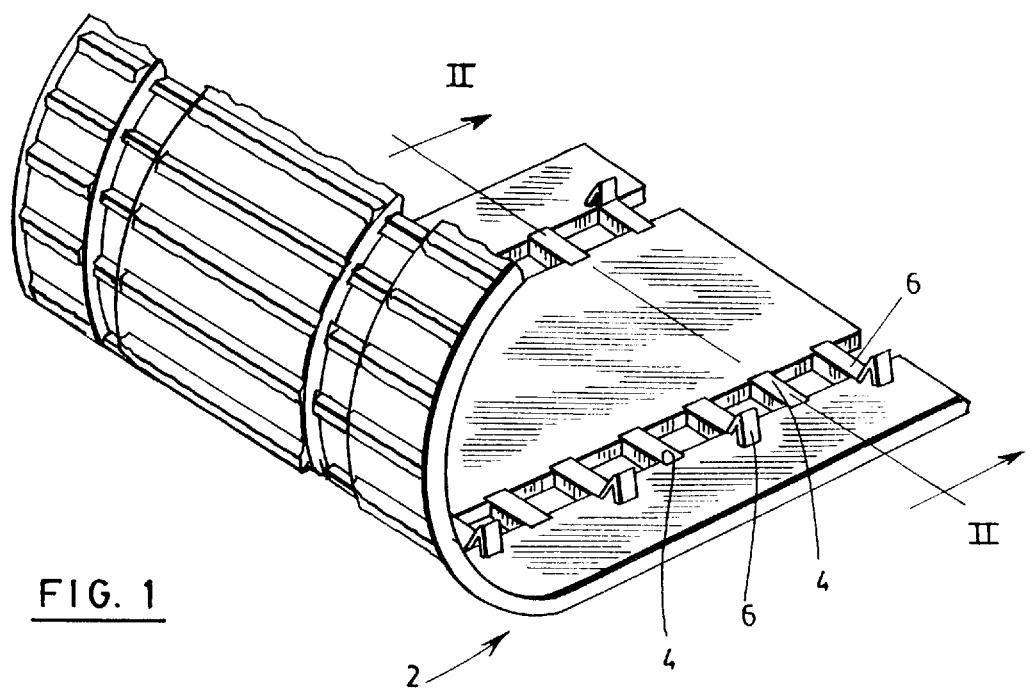
FIG. 1 is a perspective view of a portion of an endless track belt provided with clips and guide clips.
Figure 2:
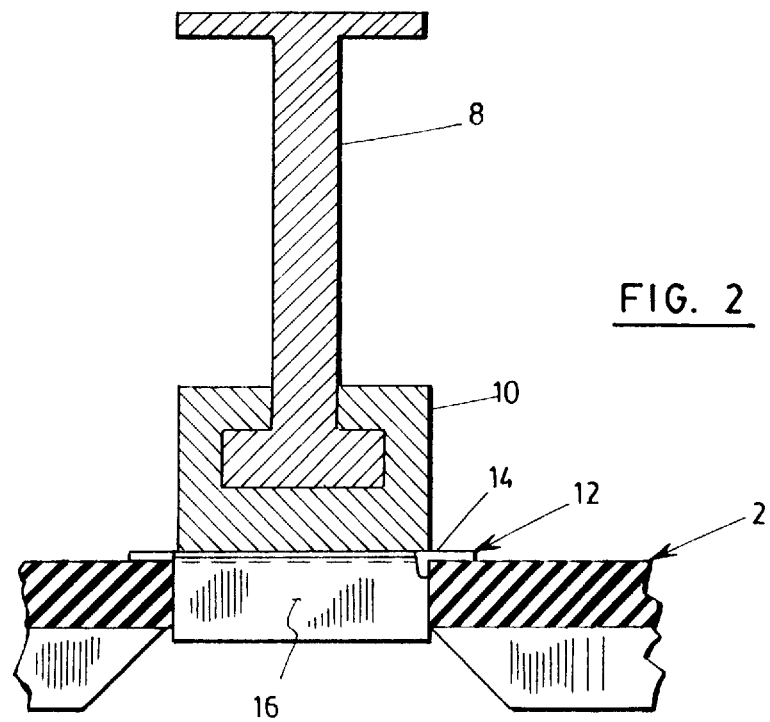
FIG. 2 is an enlarged cross-sectional view of a clip along line II—II of FIG. 1, showing the bearing surface of the clip engaging a corresponding slide rail.
Figure 3:
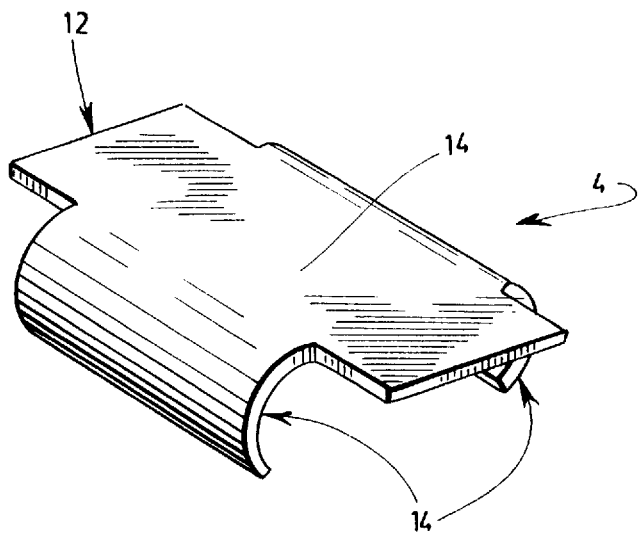
FIG. 3 is a perspective view of a preferred embodiment of a clip according to the invention.
Figure 4:
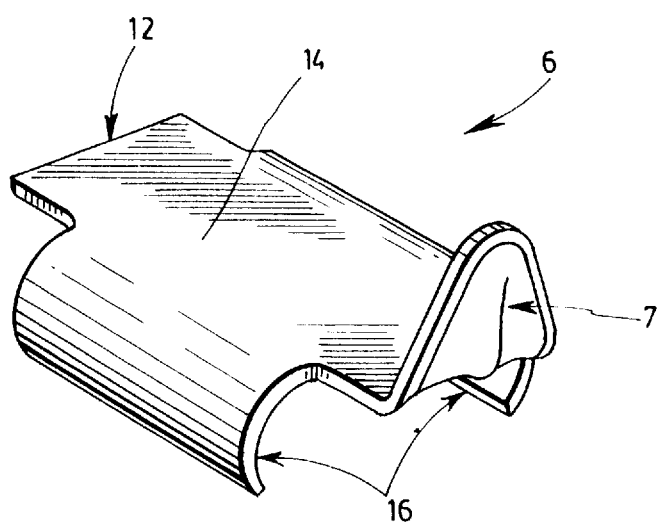
FIG. 4 is a perspective view of another preferred embodiment of a guide clip according to the invention.
Figure 5:
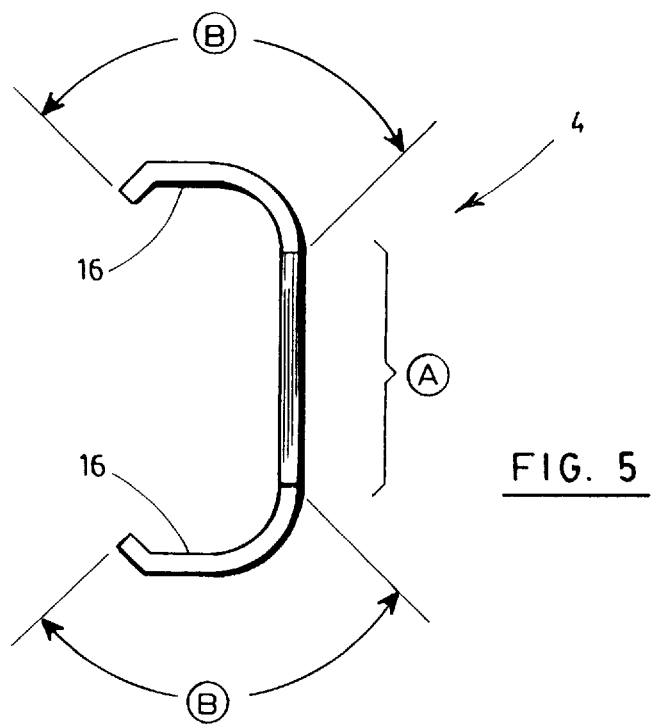
FIG. 5 is a schematic side view of the clip illustrated in either FIGS. 3 or 4 showing the relative hardness of each portion of the clip.
Figure 6:
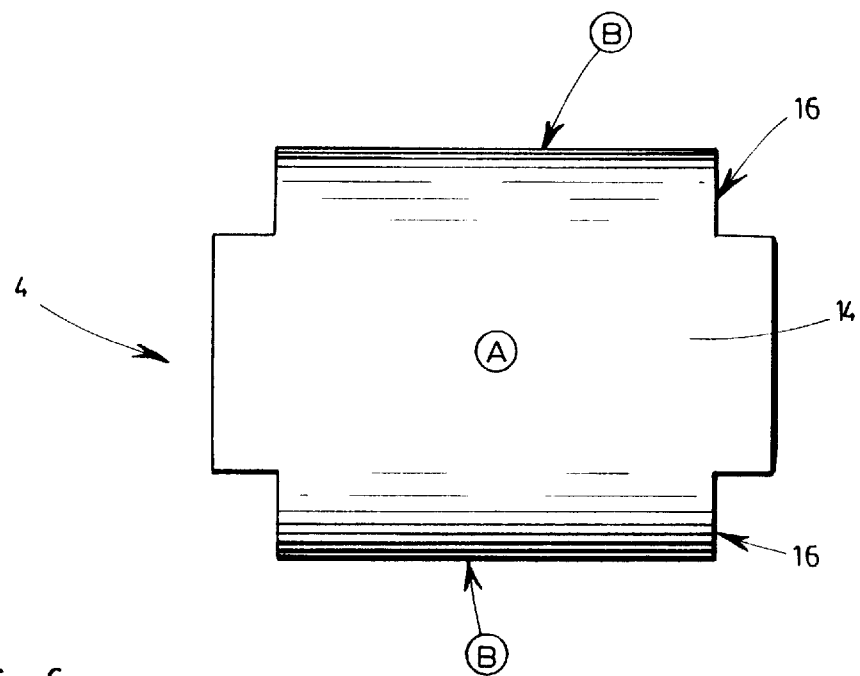
FIG. 6 is a top view of the clip illustrated in FIG. 5 showing the relative hardness of each portion of the clip.

Referring to FIGS. 1 and 2, a conventional endless track belt (2) is illustrated. It could be the track belt of a snowmobile or any other tracked vehicle provided with slide rails devised to cooperate with a track belt. The track belt (2) is provided with a series of stamped-metal clips (4) and guiding clips (6) extending at spaced intervals along the track belt in two separate rows positioned to engage the underside of a corresponding slide rail (8), more particularly the slider shoe (10) of the snowmobile suspension system, in sliding bearing contact, as shown in FIG. 2. In another preferred embodiment, the clips (4,6) could engage directly the underside of the slide rail.

Referring to FIGS. 3 to 6, the clip (4) and guiding clip (6) according to the present invention each comprise a main portion (12) having a hardened bearing surface (14) against which a corresponding slider shoe (10) of the snowmobile or tracked vehicle is to be applied, as shown in FIG. 2. A hardened bearing surface means that the bearing surface (14) has gone through a hardening treatment for providing a given hardness to the bearing surface (14) and thereby providing a good durability to the bearing surface (14). The hardness of the bearing surface (14) is preferably greater than 35 HRC, more preferably it is comprised between 40 and 60 HRC and most preferably it is comprised between 40 and 50 HRC. The region of maximum hardness is indicated as zone A in FIGS. 5 and 6.

Each of the clips (4) and guiding clips (6) further comprises an unhardened fastening portion (16) to fasten or clamp the main portion (12) to the track belt (2). Preferably, this fastening portion consists of two opposite wings (16) forming an integral part of the clips (4,6) and each extending downwardly from a side of the main portion (12). Unlike the bearing surface (14), these wings (16) are unhardened. They did not go through a hardening treatment as the main portion (12) did. Therefore, they are not as hard as the main portion and they allow the clips (4,6) to be clamped to the track belt (2) without rupture. Preferably, the hardness of the wings (16) is smaller than 35 HRC. The region of minimum hardness is indicated as zone B in FIGS. 5 and 6. Between zone A and B, there is a zone of intermediate hardness where the clip gradually passes from a maximum hardness to a minimum hardness.

As can be appreciated, the guiding clips (6) comprise a guide part (7) projecting outwardly and upwardly from one end of the bearing portion to keep the track belt in alignment with the corresponding slide rail (8).

As can be appreciated, a clip according to the present invention, while showing a very good hardness at a location where the clip requires a good resistance to friction and wear, still shows a good deformability at a location, that is the wing (16) portion, where the clip requires such a deformability to be able to clamp the clip to the track belt without rupturing the wings (16).

The clips (4,6) may be made of any metal that responds to a given hardening treatment. It is preferably made of a metal that can be thermally or mechanically hardened such as any steel, carbon allied steel or allied steel. Also preferably, the metal is resistant to tempering such that the bearing surface (14) does not lose its hardness as the heat generated by the friction between the clips (4,6) and the slider shoe (10) increases in use. A suitable material may be a 4130 ASTM alloy steel, but any other material with the above-mentioned characteristics is suitable.

A clip as described hereinabove may be fabricated by performing a method according to the present invention. A preferred version of the method comprises the steps of :

a) austenizing only the main portion (12) of the clips (4,6); and b) quenching the entire clips (4,6) at a temperature providing a hardness of the main portion (12) higher than 35 HRC, preferably of from about 40 HRC to about 60 HRC.

Preferably, the method further comprises an additional step, after step b), of:

c) tempering at least the main portion (12) of the clip to a temperature comprised substantially between 400° F. and 450° F.

In a preferred embodiment, the austenization in step a) is performed by using an induction heating process where the clip is maintained close to an induction coil until the austenization temperature is reached and the quenching is performed at a temperature below the Ms temperature of the steel used, the Ms temperature consisting of the temperature at which instantaneous transformation of austenite to martensite starts. In a preferred embodiment where the clip is made of a 4130 ASTM steel, the clip is quenched in water and tempered at 400° F. The austenization of the main portion may also be processed by simply using a torch.

Another preferred version of a method for improving a stamped-metal clip according to the present invention comprises the steps of:

a) austenizing the entire clip; and b) quenching only the main portion of the clip at a temperature providing a hardness of the bearing surface greater than 35 HRC, preferably greater than 40 HRC, and slowly cooling the fastening portion.

Preferably, this method comprises an additional step after step b) of:

c) tempering at least the main portion of the clip to a temperature comprised substantially between 400° F. and 450° F.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

What is claimed is:

1. A method for improving a stamped-metal clip for use with an endless track belt cooperating with slide rails, the stamped-metal clip being made of steel and including a main portion having a bearing surface to be engaged against at least one of the slide rails and a fastening portion to fasten the main portion to the track belt, the method comprising the steps of:

a) austenizing only the main portion of the clip; and b) quenching the entire clip at a temperature providing a hardness of the main portion higher than 35 HRC.

2. A method as claimed in claim 1, comprising an additional step, after step b), of:

c) tempering at least the main portion of the clip to a temperature comprised substantially between 400° F. and 450° F.

3. A method as claimed in claim 2, wherein, in step b), the entire clip is quenched at a temperature providing a hardness of the main portion of from about 40 HRC to about 60 HRC.

4. A method as claimed in claim 3, wherein the austenization in step a) is performed by using an induction heating process.

5. A stamped-metal clip obtained by the method defined in claim 1.

6. A method for improving a stamped-metal clip for use with an endless track belt cooperating with slide rails, the stamped-metal clip being made of steel and including a main portion having a bearing surface to be engaged against at least one of the slide rails and a fastening portion to clamp the main portion to the track belt, the method comprising the steps of:

a) austenizing the entire clip; and b) quenching only the main portion of the clip at a temperature providing a hardness of the bearing surface greater than 35 HRC and slowly cooling the fastening portion.

7. A method as claimed in claim 6, comprising an additional step, after step b) of:

c) tempering at least the main portion of the clip to a temperature comprised substantially between 400° F. and 450° F.

8. A method as claimed in claim 7, wherein in step b), the main portion is quenched at a temperature providing a hardness of the bearing surface greater than 40 HRC.

9. A stamped-metal clip obtained by the method defined in claim 6.

* * * * *